June 27, 1944. J. YOUHILL 2,352,505
MANUFACTURE OF NUTS AND OTHER SCREWTHREADED MEMBERS
Filed July 21, 1942 2 Sheets-Sheet 2
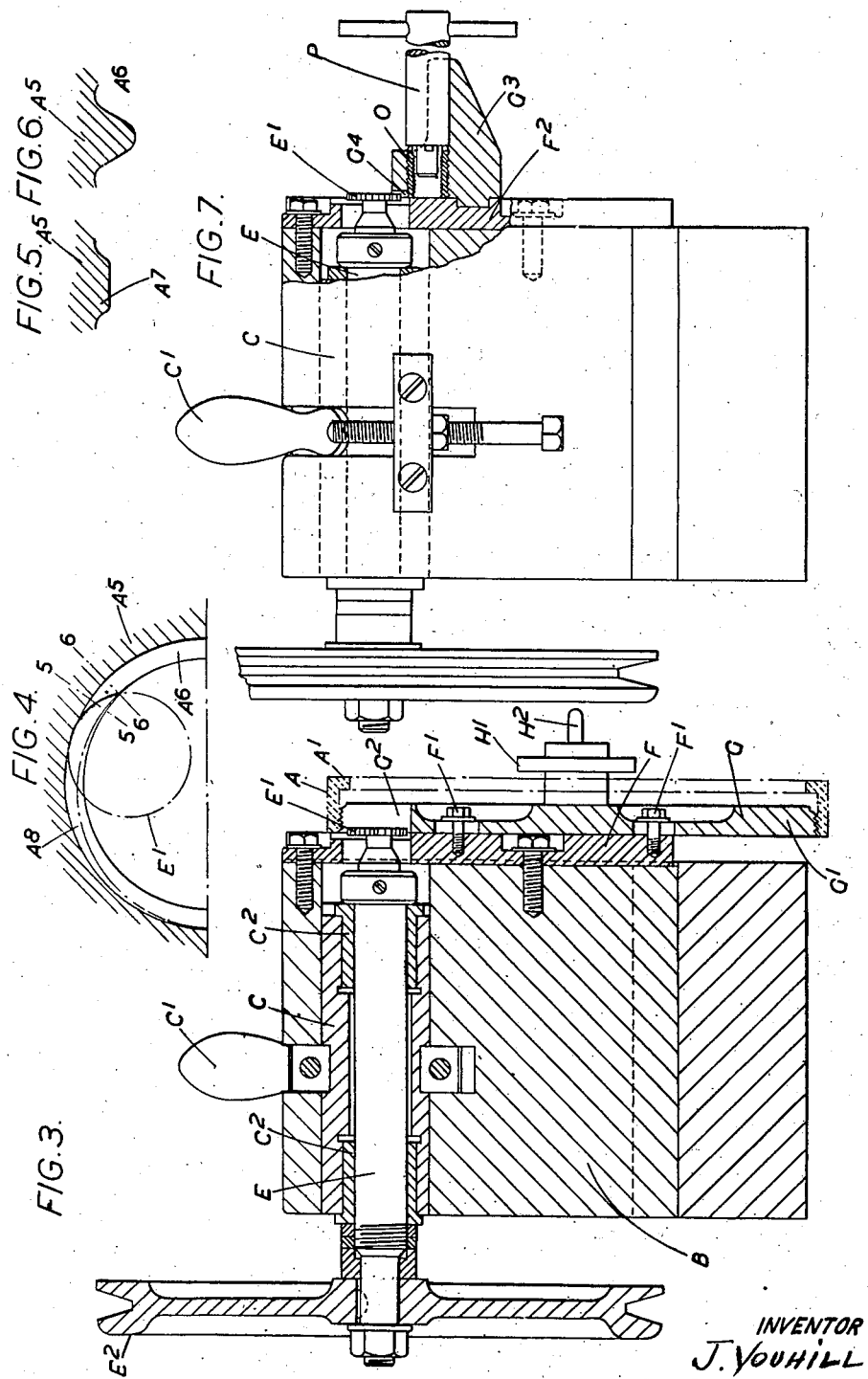
INVENTOR
J. YOUHILL
BY Blair Kilcayne
ATTORNEYS Patented June 27, 1944

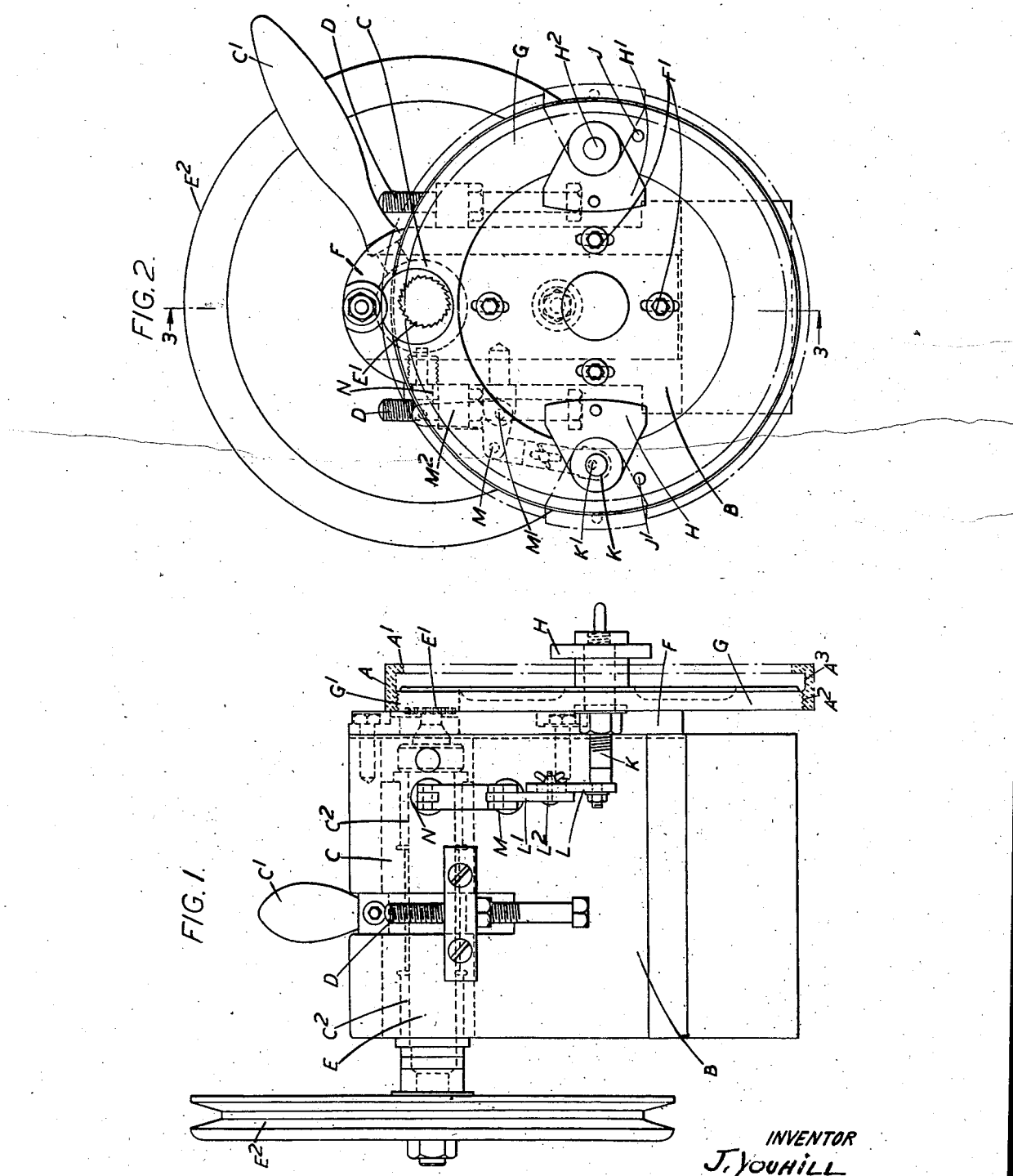

2,352,505

UNITED STATES PATENT OFFICE 2,352,505

MANUFACTURE OF NUTS AND OTHER SCREW-THREADED MEMBERS

Joseph Youhill, Staines, England, assignor to D. Napier & Son Limited, London, England, a company of Great Britain Application July 21, 1942, Serial No. 451,783
In Great Britain August 20, 1941

8 Claims. (Cl. 90—15)

This invention relates to the manufacture of screwthreaded members and has for its object to effect a finishing-off of the end portion or portions of the thread.

As usually made the end portion of the thread on or in a screwthreaded member tapers down to a fine end which is liable to be distorted or to partly break away and form a ragged and projecting piece. In either case this distorted part tends to interfere with the application and screwing up of the member in the place where it is to go or the screwing together of two members. The object of this invention is to obviate this disadvantage by a definite finishing-off of the thread.

According to this invention the end portion of the thread of a screwthreaded member is removed by a milling process which leaves the thread end of substantial width. In the process by which this is done the piece to be treated is engaged by its screwthread with and thus held by an adapter or support, a rotating milling cutter is then brought against the thread at a point adjacent to its extreme end and the piece to be treated is then rotated relatively to its support causing the end portion of the thread to be removed by the cutter thus leaving the thread with an end having a substantial width. When screwed into engagement with the support the piece to be treated is held with the end part of its thread located with respect to the milling cutter the place at which this is to operate on the thread being determined by a stop which limits the distance to which the piece can be screwed into engagement with the support, the piece being then rotated about an axis parallel to that of the cutter spindle. The apparatus for carrying out this process comprises in combination an adapter or support with which the piece to be treated is engaged by its screwthread up to a determined point whereby the end part of the thread is definitely located, a rotating spindle whose axis is parallel to the axis of the piece to be treated as this is held by the support, this spindle carrying a milling cutter which lies adjacent to the work piece when the latter is engaged with its support with the cutter initially clear of the thread, and means for moving the rotating spindle in a direction normal to its axis and thus bringing the cutter against the end part of the thread which is thereby removed. This removal commences at the determined point and continues for the required distance as the piece to be treated is turned back with respect to its support.

The holder or support for the work piece is mounted in a slide or otherwise so that it can be moved transversely with relation to the axis of the cutter spindle thereby enabling the depth to be determined of the cut which is to be taken to remove the end part of the thread. For use in some cases a stop may be provided which while the cutter is operative prevents the piece to be treated from being turned back beyond a limited and determinable distance with respect to its adapter or support with which it is in screwthreaded engagement whereby the length of the cut in the circumferential direction can be fixed.

The rotating spindle on one end of which is the milling cutter is mounted in bearings in a rotatable carrier member, but with the axis of the spindle eccentric with respect to the axis about which the carrier member itself can be rotated. The support with which the piece to be treated is engaged by its screwthread holds it with its axis parallel to that of the cutter spindle with the cutter lying adjacent to but clear of the thread. By suitable means, for example a projecting lever or handle, the carrier member is rotated thereby moving the cutter spindle so as to bring the cutter against the end part of the thread. The work piece is then turned back in or on its support so as to cause the desired cut to be completed.

The cut thus taken removes all that end portion of the thread which was liable to be distorted or partly broken away and leaves the thread with its end at a place where it has such a substantial width as may be or may approximate to its full width.

The process may be employed with screwthreaded members or parts whether the thread is within or on the exterior of such part and whether the thread runs throughout the whole length of the part or otherwise. Thus for example in the case of nuts, or other internally screwthreaded pieces, the end of the thread may be treated in accordance with this invention whether the thread is carried right through the piece or whether it extends within the piece only for a certain distance. An instance of the latter is to be found in a nut or like piece of the cap type; that is, a part which either forms a complete cap or which has a central hole surrounded by an annular flange at the "blind" end, the piece being internally threaded up to a point near the flange or closed end. In such a piece the inner end of the thread will ordinarily end with a fine part at the annular recess which it is usual to form at that end of the thread and next to the closed end or flange. By the present process this inner end of the thread can be finished off in the same way as the outer end of the thread.

It will be understood that a separate adapter or holder for the work piece is provided in accordance with the size and form of the part to be treated and the holder is shaped so as to permit of the cutter being brought against the thread in the place and in the manner desirable.

The invention may be carried into practice in various ways but the accompanying drawings show by way of example two constructions of apparatus that may be used for the purpose and for the treatment respectively of a part which is internally screwthreaded and one which has an external thread. In these drawings, Figure 1 is a side elevation of an apparatus for removing the end portions of the thread of an internally threaded member of the cap nut type.

Figure 2 is an end view of this apparatus.

Figure 3 is a sectional elevation the section being taken on the line 3—3 in Figure 2.

Figure 4 is a somewhat diagrammatic end view on an enlarged scale showing the end portion of an internal screwthread and indicating the part removed by the cutter.

Figures 5 and 6 are diagrammatic sections respectively on the lines 5—5 and 6—6 in Figure 4 and showing the appearance of the thread at the place where the cut commences and at a point where it has been partly removed.

Figure 7 is a part-sectional side elevation of an apparatus as arranged for removing the end portion of the thread on an externally screwthreaded piece.

Referring to Figures 1, 2 and 3, the work piece is indicated as a member of the cap nut type having a cylindrical part A with an inwardly directed annular flange $A^1$ at one end, the cylindrical part being internally screwthreaded at $A^2$ from its outer end to a point short of the flange $A^1$, there being an annular recess $A^3$ between the inner end of the thread and the inner face of the flange.

In the upper part of a framing B of suitable form and dimensions there is rotatably mounted a carrier C from which projects through an opening in the framing, a handle $C^1$ by means of which the carrier can be rotated through an angle which is determined by adjustable stops D between which the handle can swing. In bearings $C^2$ within the carrier C lies a spindle E on one end of which is a cutter $E^1$ and on the other a pulley wheel $E^2$ through which the cutter spindle can be rotated. The axis of this spindle E is eccentric with respect to the axis about which the carrier C can be turned so that as the carrier is turned by means of its lever handle $C^1$ the cutter $E^1$ will be moved in a direction transverse to the axis of the cutter spindle E whereby the cutter can be brought up to make the desired cut.

On the one end of the framing B is mounted a plate F which in turn carries an adapter G constituting a support for the piece A $A^1$ to be treated. This adapter can slide for example in guides on the plate F to which it is attached by studs $F^1$ so that the position of the adapter can be adjusted relatively and in a direction transverse to the cutter $E^1$. This permits the depth of the cut taken to be determined. The end of the spindle E with the cutter $E^1$ projects through an opening in the end plate F so that when the carrier C is turned there is clearance for the cutter $E^1$ to be brought against the thread within the work piece A $A^1$. The manner in which the adapter is mounted on the plate F and thus on the framing B is such as to allow of the adapter being readily removed and interchanged for others which will hold different pieces to be treated.

The adapter thus projects beyond the face plate F and to an extent determined by the nature of the part which is to be held by it for treatment. The peripheral part of the adapter is screwthreaded as at $G^1$ to engage the work piece A, $A^1$ which can be screwed on to the adapter until the end face of the work piece comes in contact with the surface of the face plate F. The work piece will then be located with respect to the cutter $E^1$ with the end portion of the thread which is to be removed in a position where it can be acted on by the cutter when swung into its operative position by rotation of the carrier C. A suitable hollow $G^2$ formed in the adapter leaves clearance for the cutter $E^1$.

When the cutter has been brought into action the work piece is turned back on the adapter by hand or otherwise and as it is turned the cutter removes the end part of the thread. This process is shown clearly in Figure 4 where is seen the end of an internally screwthreaded work piece $A^5$. The main part $A^6$ of the thread appears with the cutter $E^1$ in the position into which it has been swung to begin its cut. As it appears in section the main part $A^6$ of the thread is seen in Figure 6, and as partly removed by the cutter it is seen in Figure 5 with a flat surface at $A^7$. When the full depth of cut has been taken the flat surface $A^7$ is lowered and as the work piece is turned back on the adapter holder the end portion $A^8$ of the thread will be taken off and a substantially cylindrical surface left with the actual end of the thread of full width and sloping up to the full thread section.

Where this apparatus is to be used to finish off the inner end of the thread in a piece such as a nut of the cap type A $A^1$, the thread to be removed being that adjacent to the annular recess $A^3$, there is either employed a different adapter arranged so that the work piece can be screwed further thereon so as to bring the cutter $E^1$ into the right place in the axial direction, or a different cutter is used which will project further into the cap nut. It is now desirable to provide means which when the cutter is operating will prevent turning the work piece back on the adapter beyond such a limited distance as is necessary to allow the cutter to take off just the requisite length of the end portion of the thread and no more. Without such a limiting stop there would be a risk of removing an undesirable length of the thread, or even the whole of it might be taken off. Such a stop device is shown in Figures 1 and 2 and comprises two oppositely disposed lugs H $H^1$ each of which is pivotally mounted so that it can be swung separately and outwards from the inwardly directed and inoperative positions in which these lugs are shown in Figure 2, into the positions shown in chain lines wherein the lugs lie over the outer end face of the work piece flange $A^1$. When in this position the lugs prevent the turning of the work piece backwards beyond a limited extent which can be determined by adjustment of the lugs. It is desirable to arrange that at least one of these lugs cannot be swung clear of the work piece so as to allow it to be unscrewed off the adapter until the carrier C has been turned so as to lower the cutter and take it clear of the thread. This may be effected in the following way. The one lug $H^1$ is carried freely on its pivot $H^2$ about which it can be turned from one position into the other being supported by a fixed stop pin J when in its operative position. The other lug H is fixed on a spindle K which runs through and is rotatable in the adapter G having on its end behind the adapter an eccentric pin $K^1$ which passes through the one part of a link formed in two parts L $L^1$ adjustably connected by a bolt $L^2$ passing through slots in the parts L $L^1$ so that the length of the link can be altered. This link runs to one arm M of a bell-crank lever pivoted at $M^1$ on the framing B. The other arm $M^2$ of this lever is connected to a pin N which can slide in the framing the end of this pin being adapted to enter a hole in the carrier C and thus lock the latter when it has been turned into the position in which the cutter spindle has been lowered and the cutter cannot operate on the work piece. When the pin N has been withdrawn and the carrier has been turned to render the cutter operative the end of the pin N lies against the side of the carrier and to withdraw it and bring it into that position the lug H must have been swung so as to lie over the face of the work piece and thus limit the distance to which it can be turned back on the adapter. The lug cannot be again swung clear of the work piece until the cutter has been moved clear of the thread by rotation of the carrier. A fixed stop $J^1$ supports the lug H when it has been swung into its operative position.

As shown in Figures 1 and 3 the lugs H $H^1$ are indicated in their inoperative positions since these figures illustrate the apparatus as arranged for the removal of the outer end of the thread in the work piece A $A^1$. The lugs H $H^1$ are adjustable in the axial direction on the spindle K and the pivot $H^2$ respectively.

If it is desired to remove the inner end of the thread from a cap nut such as A $A^1$, assuming that the adapter has been changed or the cutter altered so as to bring it into the necessary place in the axial direction, the work piece is then screwed on to the adapter up to its limit position. The lugs H $H^1$ are then swung out so as to lie over the outer end face of the cap nut when they will be as indicated in chain lines in Figure 2 and be able to prevent unscrewing of the work piece from the adapter beyond the distance determined by the arrangement of the stop lugs H $H^1$, that is the clearance inside them when the work piece has initially been screwed home on the adapter. The carrier C can now be turned so as to cause the cutter to act on the thread at its inner end and by turning back the work piece on the adapter up to the limit allowed by the stop lugs H $H^1$ the desired length of thread will be taken off. The carrier is now turned so as to lower the cutter where it can no longer act on the thread and it then becomes possible to swing the lug H clear of the face of the cap nut since the pin N can now enter the hole in the carrier. The work piece can now be taken off the adapter which has held it during the operation.

Turning now to the modified construction of the apparatus as shown in Figure 7 and arranged for removing the end part of the thread on an externally threaded body, the adapter or support $G^3$ for the work piece O is formed so that the latter can be screwed into the support until its end abuts against the face plate $F^2$ on which the adapter is adjustably mounted. A gap $G^4$ in the inner part of the adapter leaves clearance for the cutter $E^1$ to act on the end portion of the thread which is located in this gap when the work piece is screwed home in the adapter. The cutter spindle E is mounted as before in a carrier C which can be turned by means of the lever handle $C^1$ when, owing to the eccentricity of the spindle in the carrier, the cutter will be brought down on the work and the necessary cut made. The work piece is turned back in the support $G^3$ by some tool such as P of which the end engages the outer end of the work piece which in the case shown is hollow. Here it is not necessary to provide any stop to limit the turning back of the work in the support since the cut starts at the furthest point in the thread where it is desirable that the thread should end and by turning back the work the cut is carried to the extreme end of the thread.

The adapter for an externally threaded piece may be interchangeably mounted on the framing through a face plate or otherwise in some convenient way as for instance as described above in connection with the support for an internally threaded piece. Also the adapter is arranged so that it may be adjusted in a direction transverse to the cutter spindle so as to permit of the depth of cut being varied and set as requisite.

What I claim as my invention and desire to secure by Letters Patent is:

1. Apparatus for removing the end portion of the thread of a screwthreaded member comprising in combination a framing, an adapter mounted on the framing and constituting a support for the piece to be treated which is held by and engaged with that support by its screwthread, a rotating spindle mounted in the framing and carrying a milling cutter which lies adjacent to and initially clear of the thread of the piece to be treated when this is in engagement with its support, the axis of this spindle lying parallel to the axis of the piece to be treated as it is held by the support, and means for moving the said rotating spindle in a direction normal to its axis and thus bringing the cutter against the end part of the thread.

2. A process for removing the end portion of the thread of a screwthreaded member which comprises mounting the screwthreaded member for rotation eccentrically with respect to a rotary milling cutter having the rotary axis thereof parallel to the rotary axis of the screwthreaded member, aligning the milling cutter adjacent to the extreme end of the thread of the screwthreaded member, and rotating the milling cutter and the screwthreaded member relative thereto to cut away the end portion of the thread so that it is formed of a substantial width.

3. A process for removing the end portion of the thread of a screwthreaded member which comprises mounting the screwthreaded member for rotation eccentrically with respect to a rotary milling cutter having the rotary axis thereof parallel to the rotary axis of the screwthreaded member, aligning the milling cutter adjacent to the extreme end of the thread of the screwthreaded member, rapidly rotating the milling cutter and rocking the rotary milling cutter into a predetermined portion of the end screwthread of the screwthreaded member, and rotating the screwthreaded member relative to the milling cutter to cut away the end portion of the thread so that it is formed of a substantial width.

4. Apparatus for removing the end portion of the thread of a screwthreaded member comprising in combination a framing, an adapter mounted on the framing and constituting a support for the piece to be treated which is held by and engaged with that support by its screw-thread, said adapter having a gap or the like through which the cutting tool may be passed to act on the piece mounted on said adapter, a rotating spindle at one end of which is a milling cutter, the axis of this spindle lying parallel to the axis of the piece to be treated as this is held by the support, a carrier rotatably mounted in the framing and having in it bearings in which the said spindle rotates with its axis eccentric with respect to the axis about which the carrier is rotatable, and means for rotating the carrier and thereby moving the rotating spindle in a direction normal to its axis and thus bringing the milling cutter from a position in which it is initially clear of the thread of the piece to be treated through the said gap and into a position in which the cutter is operative on that thread.

5. Apparatus for removing the end portion of the thread of a screwthreaded member comprising in combination a framing, an adapter mounted on the framing and constituting a support for the piece to be treated which is held by and engaged with that support by its screw-thread, said adapter having a gap or the like through which the cutting tool may be passed to act on the piece mounted on said adapter, a rotating spindle mounted in the framing, the axis of this spindle lying parallel to the axis of the piece to be treated as this is held by the support, a milling cutter on the one end of the spindle where it lies adjacent to and initially clear of the thread of the piece to be treated when this is in engagement with its support, means for moving the adapter support transversely with respect to the spindle and thereby determining the depth of the cut on the thread, and means for moving the rotating spindle in a direction normal to its axis and thus bringing the cutter through said gap in the adapter against the end part of the thread.

6. Apparatus for removing the end portion of the thread of a screwthreaded member as set out in claim 1 in which the adapter support is detachably mounted on the framing and is adjustable in a direction transverse to the axis of the rotating spindle.

7. Apparatus for removing the end portion of the thread of a screwthreaded member comprising in combination a framing, an adapter mounted on the framing and constituting a support for the piece to be treated which is held by and engaged with that support by its screw-thread, said adapter having a gap or the like through which the cutting tool may be passed to act on the piece mounted on said adapter, a rotating spindle mounted in the framing and carrying a milling cutter which lies adjacent to and initially clear of the thread of the piece to be treated when this is in engagement with its support, the axis of this spindle lying parallel to the axis of the piece to be treated as it is held by the support, means for moving the said rotating spindle in a direction normal to its axis and thus bringing the cutter through said gap in the adapter against the end part of the thread, means for rotating the piece to be treated relatively to the adapter support and while the piece is held thereby such rotation being in a direction tending to unscrew the piece and disengage it from the support, and means for limiting the extent of such backward unscrewing while the cutter continues to be operative on the thread.

8. Apparatus for removing the end portion of the thread of a screwthreaded member comprising in combination a framing, an adapter mounted on the framing and constituting a support for the piece to be treated which is held by and engaged with that support by its screw-thread, said adapter having a gap or the like through which the cutting tool may be passed to act on the piece mounted on said adapter, a rotating spindle at one end of which is a milling cutter, the axis of this spindle lying parallel to the axis of the piece to be treated as this is held by the support, a carrier rotatably mounted in the framing and having its bearings in which the said spindle rotates with its axis eccentric with respect to the axis about which the carrier is rotatable, means for rotating the carrier and thereby moving the rotating spindle in a direction normal to its axis and thus bringing the milling cutter through said gap in the adapter from a position in which it is initially clear of the thread of the piece to be treated into a position in which the cutter is operative on that thread, means for rotating the piece to be treated relatively to the adapter support and while the piece is held thereby such rotation being in a direction tending to unscrew the piece and disengage it from the support, and means for limiting the extent of such backward unscrewing while the cutter continues to be operative on the thread.

JOSEPH YOUHILL.